United States Patent [19]

Walls et al.

[11] Patent Number: 4,690,095
[45] Date of Patent: Sep. 1, 1987

[54] COOKING AND WHISTLING KNOB THEREFOR

[75] Inventors: Henry M. Walls, Pittsburgh; George M. Sayers, Jr., Clearfield, both of Pa.

[73] Assignee: TSCO Corporation, Hickory, Pa.

[21] Appl. No.: 865,949

[22] Filed: May 19, 1986

Related U.S. Application Data

[63] Continuation of Ser. No. 512,072, Jul. 8, 1983, abandoned.

[51] Int. Cl.⁴ .................. A47J 27/212; G08B 3/00
[52] U.S. Cl. .................. 116/67 R; 99/344; 126/388
[58] Field of Search .......... 116/67 R, 70, 103, 112; 220/203; 126/388; 99/344; 222/39

[56] References Cited

U.S. PATENT DOCUMENTS

| | | | |
|---|---|---|---|
| 158,675 | 1/1875 | Carman | 126/388 |
| 196,443 | 10/1877 | Garvin et al. | |
| 259,580 | 6/1882 | Ohm | |
| 1,699,089 | 1/1929 | Arons | 116/70 |
| 2,113,396 | 4/1938 | Butterfield | 116/137 R |
| 2,536,369 | 1/1951 | Hubbard | 126/388 |
| 3,736,917 | 6/1973 | Stepanek | 220/367 |
| 4,134,358 | 1/1979 | Heermans | 116/70 |
| 4,155,349 | 5/1979 | Hudson | 126/388 |
| 4,548,156 | 10/1985 | Shibata | 116/70 |
| 4,586,455 | 5/1986 | Shibata | 99/342 X |

FOREIGN PATENT DOCUMENTS

| | | | |
|---|---|---|---|
| 549165 | 11/1957 | Canada | 116/103 |
| 486065 | 11/1929 | Fed. Rep. of Germany | 116/137 R |
| 473640 | 10/1937 | United Kingdom | |
| 799799 | 8/1958 | United Kingdom | |

Primary Examiner—Daniel M. Yasich
Attorney, Agent, or Firm—Beveridge, DeGrandi & Weilacher

[57] ABSTRACT

A cooking vessel is provided with a whistle knob which has an internal passage for carrying steam from a hole in the cooking vessel to a rotary whistle chamber molded in the knob. The whistle chamber is displaced from and eccentric to the knob axis. The lower surface of the knob has a cavity which surrounds the knob axis, providing a steam passage inlet which is in communication with the hole in the cooking vessel regardless of the angular position of the knob relative to its axis. From the inlet cavity, steam passes through a vertically extending passage, a plenum chamber and a horizontally extending passage which introduces steam into the whistle chamber at an angle which causes an audible whistle and rotary movement of the steam. The whistle chamber has an outlet which may be opened and closed by rotational movement of a valve ring which extends circumferentially around the knob. The body of the knob is formed of two parts which are separable to permit removal of the valve ring and cleaning of the internal portions of the knob. A temperature indicating device may be incorporated in the knob.

22 Claims, 4 Drawing Figures

COOKING AND WHISTLING KNOB THEREFOR

This application is a continuation of application Ser. No. 512,072 filed July 8, 1983, now abandoned.

BACKGROUND OF THE INVENTION

This invention relates to a whistling knob for a cooking vessel, and to a cooking vessel which is provided with such a knob.

Devices which provide an audible whistle have been known for many years, both in teapots and other types of cooking vessels. In some instances exemplified by the disclosures of U.S. Pat. Nos. 196,443 and 259,580, the audible whistle is produced by introducing steam into a rotary chamber. A more recent device designed for waterless cooking vessels is described in U.S. Pat. No. 4,134,358, in which a knob is provided with a flange which lies inside the cooking vessel, a whistle chamber with centrally aligned inlet and outlet openings, and a sliding cutoff valve.

The present invention provides a knob and cooking vessel which have a number of highly desirable characteristics with respect to manufacture, assembly, operation and maintenance.

One object of the invention is to provide a whistling knob which is conveniently manufactured by molding in two part dies. The components of the device are easily assembled and easily attached to a cooking vessel. The cooking vessel itself does not require any significant modifications except for the provision of a small steam releasing hole which is located in proximity to a conventional weld stud. Due to the configuration of the device, the steam inlet thereof will be aligned with the steam releasing opening in the vessel, regardless of the rotational position of the knob with respect to its axis.

Another object of the invention is to provide a device which is efficient in producing an audible whistling sound in response to the generation of steam in the cooking vessel. The audible whistle is produced when there is a relatively small amount of steam emission, even in vessels which have loosely fitted lids. The knob is configured so that any steam condensing therewithin will return to the cooking vessel rather than flowing outwardly onto the exposed upper surface of the lid.

Another object is to provide an uncomplicated and effective valve means for disabling the whistling elements of the device.

Still another object is to provide a whistling knob which is easily disassembled and cleaned to remove any residue which may be deposited therein in the course of normal use.

SUMMARY OF THE INVENTION

According to the invention, a whistling knob for a cooking vessel is provided with a surface which engages the wall of a cooking vessel, an internal whistle chamber, and a passage which extends from the vessel-engaging surface to the whistle chamber. The passage is oriented to introduce steam into the whistle chamber at an angle which causes an audible whistle and rotary movement of steam in the whistle chamber. The whistle chamber has an outlet for releasing steam to the atmosphere. Preferably, the invention also embodies one or more of the features which are described in the subsequent paragraphs of this summary.

One feature of the invention is that the steam passage includes an open cavity which is formed in the vessel-engaging surface of the knob, surrounding the central axis of the knob to provide convenient communication with a steam release hole formed in the cooking vessel.

The invention also contemplates a whistle chamber with a vertically extending central axis which is eccentrically located with respect to the body of the knob. The steam passage in the knob includes a vertically extending first portion which leads from the surface of the knob, and a horizontally extending second portion which leads to the whistle chamber. Preferably, the passage also includes a plenum chamber; and, the second portion of the passage has converging walls for increasing the velocity of steam which is moving toward the whistle chamber. The horizontally extending portion of the passage has a lower wall which slopes downwardly to permit condensate to drain toward the first portion of the passage.

In accordance with another feature of the invention, the knob comprises two members which are detachably connected together. Each of the members forms at least one wall of the whistle chamber so that detachment of the members from each other will expose the whistle chamber to facilitate cleaning.

Still another feature of the invention is the provision of a valve means for opening and closing the whistle chamber outlet. This valve means is a valve ring which is supported on and is rotatable with respect to the body of the knob. The valve ring has an opening which is movable between positions which expose and obstruct the whistle chamber outlet. To facilitate assembly and disassembly of the device, the body of the knob is formed of two members, one member serving to support the valve ring and the other member retaining the valve ring on the knob.

Furthermore, it is a feature of the invention to provide the whistling knob with a known type of visible temperature indicator made of a material which changes color in response to temperature changes conducted thereto from the cooking vessel by metallic members in the knob.

Although the invention may take many forms, a preferred embodiment thereof is shown in the accompanying drawings and described in the following description.

DESCRIPTION OF A PREFERRED EMBODIMENT

Figure 1:
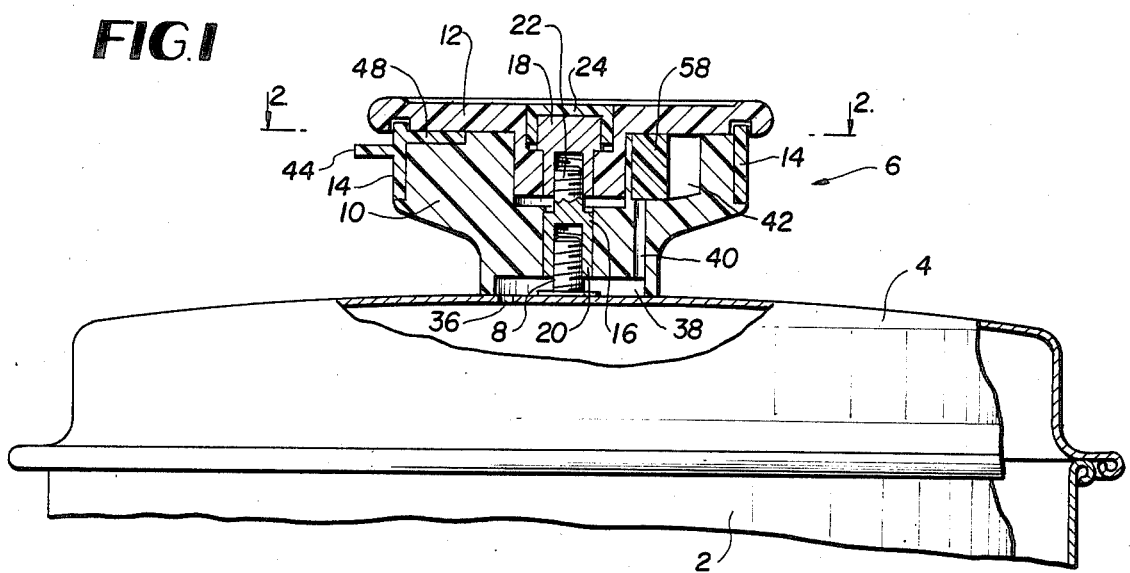
FIG. 1 is a side view of a cooking vessel utilizing a whistling knob constructed according to the invention, wherein the knob and portions of the cooking vessel are shown in cross section.

FIG. 1 shows a cooking vessel comprising a main body 2 and a cover or lid 4 which, acting together, provide the walls of a cooking enclosure. The lid 4 rests loosely on the main body 2 without any frictional or interference fit. A knob 6 is connected to the lid by an upstanding externally threaded stud 8, referred to in the art as a weld stud or weld nut, which is welded to the lid in accordance with conventional practice.

The body of the knob 6 comprises a lower member 10 and an upper member 12. These members and a valve member 14, described below, are molded from a thermosetting plastic of low thermal conductivity. A suitable material for this purpose is the phenolic molding compound sold under the trademark PLENCO 349 by Plastics Engineering Company, Sheboygan, Wisc. The members 10 and 12 are connected together by threaded brass inserts 16 and 18 which are molded in the plastic or are press fit into the plastic members after molding. These inserts have knurled external surfaces to assure their secure retention in the respective plastic members. As shown in FIG. 1, the lower insert 16 has an interiorly threaded lower portion 20 and an exteriorly threaded upper portion 22. The upper insert 18 has an interiorly threaded lower portion which is engaged by the external threads of the insert 16 in the lower member. This threaded engagement permits detachment of the upper member from the lower member to facilitate the cleaning of the internal passages and chambers of the knob.

Optionally, on the upper end of the brass insert 18, there is a coating formed of a material which changes color in response to temperature changes. A transparent cap 24 is placed over the coated surface of the insert. Such coating materials and their characteristics are well known and examples thereof are described in U.S. Pat. No. 3,701,344, the disclosure of which is referred to and incorporated herein by reference.

The knob 6 is attached to the cooking vessel by threading the lower insert onto the weld stud 8 on the lid 4. When the cooking vessel is in use, heat from the cooking vessel is conducted by means of the metallic inserts 16 and 18 to the temperature indicating coating on the insert 18. Color changes of this coating provide the cook with a visual indication of the temperature of the cooking vessel.

In the operation of the present invention, the knob 6 will emit an audible whistle when steam is generated in the cooking vessel. This whistle signal is produced when the rate of steam generation is relatively low, and it does not require forcible or frictional attachment of the lid to the main body of the cooking vessel.

Figure 2:
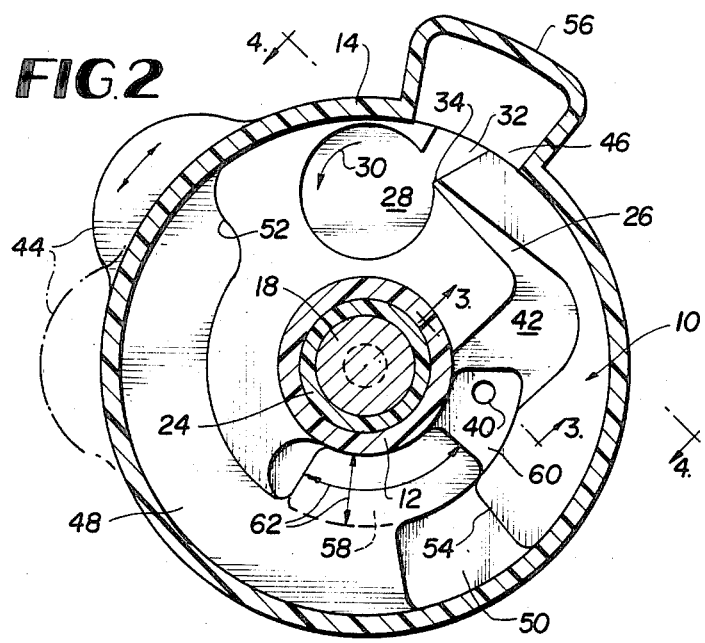
FIG. 2 is a sectional view of the knob as seen along the line 2—2 in FIG. 1, except that the valve ring thereof is in its open position.

The principal sound generating elements of this invention, best seen in FIG. 2, are a steam passage 26 and a whistle chamber 28. The whistle chamber 28 has a vertical central axis which is eccentrically located with respect to the body of the knob 6. The side and bottom walls of the passage 26 and chamber 28 are molded in the lower member 10. The upper member 12 comprises the upper walls of passage 26 and chamber 28. The steam passage 26 introduces steam into the whistle chamber 28 at an angle which causes an audible whistle and rotary movement of steam in the whistle chamber. The general direction of this rotary movement is shown by the arrow 30. An outlet 32 releases the rotationally moving steam to the atmosphere. Applying the sound generating principle applicable to police whistles, the steam from passage 26 creates vortices in the vicinity of a lip 34 of the whistle chamber. These vortices produce a whistling sound which is reinforced by the steam which returns to the lip 34 after having moved in a rotary path in the chamber 28.

The optimum sizes and orientations of the sound generating components may be determined experimentally. In one case where the whistle chamber 28 had a diameter of about 0.562 inch, it was found that the best results were obtained when the width of the outlet of passage 26, as seen in FIG. 2, was in the range of about 0.015 to 0.030 inch, preferably about 0.022 to 0.027 inch, and the width of the outlet 32 was about 0.156 inch.

Steam is supplied to the knob by a steam releasing hole 36 in the lid 4. As shown in FIG. 1, this hole 36 is located beneath the lower knob surface which engages the lid 4. Passage means in the knob extend from its lower surface to the whistle chamber 28. This passage means includes an open circular cavity 38 in the lower surface of the knob, a vertically extending first portion 40, a plenum chamber 42, and a horizontally extending second portion previously identified as 26. The circular cavity 38 surrounds the central axis of the knob so that, regardless of the angular position of the knob relative to its axis, the steam release hole 36 in the lid will be in communication with the steam passage in the knob. The plenum 42 improves the operation of the device, presumably because it permits the steam to settle down somewhat before entering the passage 26.

The upwardly extending passage 40 carries steam from the inlet cavity 38 to the plenum chamber 42, and the plenum chamber 42 has an outlet which provides steam to the horizontal passage 26. The horizontal passage preferably has converging walls so that it acts as a nozzle, increasing the velocity of steam which is moving toward the whistle chamber. For manufacturing convenience, the passages 40 and 26 preferably extend in true vertical and horizontal directions; however, the terms "horizontally extending" and "vertically extending" are intended to embrace inclined orientations which have horizontal and vertical components, respectively.

Figure 3:
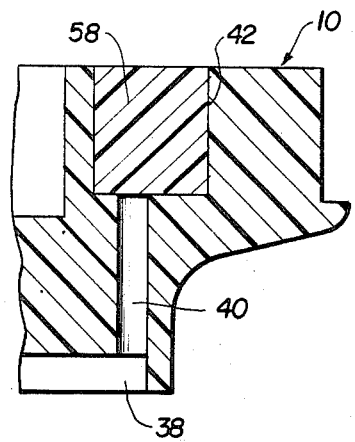
FIG. 3 is a sectional view of the lower member of the knob as seen along the line 3—3 in FIG. 2.
Figure 4:
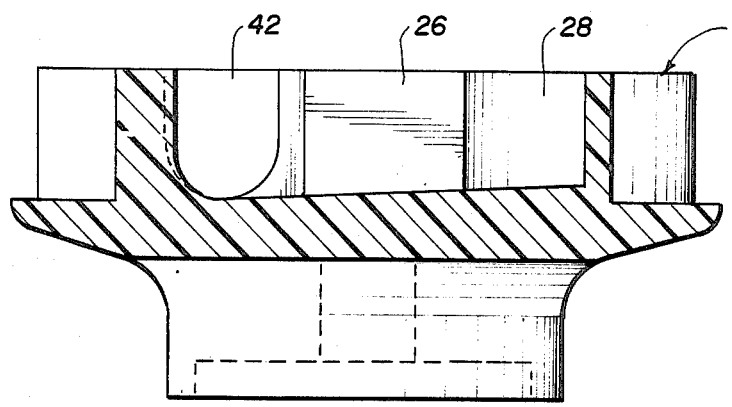
FIG. 4 is a sectional view of the lower member of the knob as seen along the line 4—4 in FIG. 2.

To encourage the drainage of condensed steam into the cooking vessel rather than to the outlet 32 of the whistle chamber, the whistle chamber 28, the horizontal passage 26 and the plenum chamber 42 are sloped downwardly toward the vertical passage. As shown in FIG. 4, this slope is about 2.5 degrees. Also, to facilitate drainage, the plenum has a concave bottom wall as shown in FIG. 3.

Another feature of the invention is that the whistle chamber 28, passage 26 and plenum 42 may be easily cleaned simply by unscrewing the upper member 12 from the lower member 10. This, in effect, removes the upper wall of the whistle chamber, exposing this chamber to permit its convenient cleaning.

In many cooking situations, a whistle signal is unneeded or undesired. Also, some cooking processes are performed at subatmospheric pressures. Therefore, the knob is provided with a valve means which disables the whistle and obstructs the steam passages of the knob. This valve is preferably a valve ring 14 which extends circumferentially around the knob body. The valve ring is movable by means of a projecting manually engageable tab 44. As shown in FIG. 2, the valve ring 14 has an opening 46 which, upon rotational movement of the valve ring, moves between the illustrated position where the whistle outlet 32 is open, and a closed position shown in broken lines where the whistle outlet is obstructed. To prevent the steam from striking the hand of a person closing the valve, the ring 14 has a shield 56 located at the opening 46. The shield has a closed upper end and an open lower end so that any escaping steam will be deflected downwardly toward the lid of the cooking vessel.

The valve ring also has a depending tang 58 which is operable to close off the upper end of portion 40 of the steam passage. Tang 58 projects into a flat-bottomed arcuate recess 60 in member 10, and this recess intersects the plenum chamber 42 as shown in FIG. 2. The location of the tang, and its circumferential and radial dimensions are shown by the arrows 62 in FIG. 2. When the valve ring 14 is in its open position, the tang leaves the passage portion 40 unobstructed as shown in FIG. 2 but, upon movement of the valve ring 14, the tang 47 occupies a passage-obstructing position as shown in FIGS. 1 and 3.

The valve ring is concentric with and rotatably supported on the lower member 10, and it is retained on the lower member 10 by means of the overlying peripheral portion of the upper member 12. The angular rotation of the valve ring 14 on the lower member is limited by an internal flange segment 48 molded integrally with the valve ring. This flange segment 48, shown in FIGS. 1 and 2, is located in a depression 50 formed on the upper surface of the lower member 10. At the opposite ends of the depression 50, the knob member 10 has abutment surfaces 52 and 54 which are engaged by the respective ends of the flange 48 when the valve ring is at its open and closed positions.

From the foregoing description, it will be realized that the invention provides a cooking vessel with a whistling knob which is uncomplicated, highly effective and easily cleaned. From the standpoint of the manufacturer, it is readily manufactured, assembled and installed. Persons familiar with the field of the invention will recognize that the invention may take many forms other than the preferred embodiment which has been illustrated and described. Therefore, it is emphasized that the invention is not limited to the disclosed embodiment but is embracing of a wide variety of devices which fall within the spirit of the following claims.

We claim:

1. A whistling knob for a cooking vessel,
   said knob having a body with a surface for engaging a wall of a cooking vessel,
   a whistle chamber in said knob, said whistle chamber having an axis,
   passage means formed in said knob and extending from said surface and has a convergent portion with a planar bottom to said whistle chamber, said passage means being oriented to introduce steam into said whistle chamber at an angle from an inlet normal to said planar bottom and in direct communication with said passage, which causes an audible whistle and rotary movement of steam in the whistle chamber, said rotary movement being in a direction which is circumferential with respect to said axis,
   said whistle chamber having outlet means for releasing steam to the atmosphere.

2. A whistling knob according to claim 1 wherein said knob has a central axis, said passage means including an open cavity formed in said surface of the knob, said cavity surrounding the central axis of the knob to provide convenient communication with a steam release hole formed in the cooking vessel.

3. A whistling knob according to claim 1 wherein said whistle chamber has a vertically extending central axis which is eccentrically located with respect to the body of the knob, said passage means including a vertically extending first portion and a horizontally extending second portion, said first portion of the passage means leading from said surface of the knob, and said second portion of the passage means leading to the whistle chamber.

4. A whistling knob according to claim 3 wherein said second portion of the passage means has converging walls for increasing the velocity of steam which is moving toward said whistle chamber.

5. A whistling knob according to claim 4 wherein the passage means includes a plenum chamber.

6. A whistling knob according to claim 4 wherein the second portion of the passage means has a lower wall which slopes downwardly to permit condensation to drain into the first portion of the passage means.

7. A whistling knob according to claim 1 wherein the knob includes two members, means for detachably connecting the members to each other, each of said members forming at least one wall of the whistle chamber so that detachment of the members from each other will expose the whistle chamber to permit convenient cleaning thereof.

8. A whistling knob according to claim 1 having valve means for opening and closing the outlet means of the whistle chamber.

9. A whistling knob according to claim 8 wherein the valve means is a valve ring which is supported on and is rotatable with respect to the body of the knob, said valve ring having an opening which is movable between positions which expose and obstruct the outlet means of the whistle chamber.

10. A whistling knob according to claim 9 wherein the body of the knob is formed of two members which are detachably connected together, said valve ring being rotatably supported on one of said members, the other said member comprising means for retaining said valve ring on the knob.

11. A whistling knob according to claim 1 having a visible temperature-indicating means thereon, said temperature-indicating means including a visibly exposed temperature-indicating member which is made of a material which changes color in response to temperature changes, said knob including metallic means for conducting heat from the cooking vessel to said temperature-indicating member.

12. A cooking vessel, comprising,
   enclosure means providing a cooking chamber, said enclosure means having a wall which has a steam releasing hole therein,
   a whistling knob having a body with a surface which engages said wall,
   a whistle chamber in said knob, said whistle chamber having an axis,
   passage means formed in said knob and extending from said surface and has convergent portion with a planar bottom to said whistle chamber, said passage means having an inlet which is in communication with the steam releasing hole of the enclosure means, said inlet normal to said planar bottom and in direct communication with said passage said passage means having an outlet which is oriented to introduce steam into said whistle chamber at an angle which causes an audible whistle and rotary movement of steam in the whistle chamber, said rotary movement being in a direction which is circumferential with respect to said axis,
   said whistle chamber having outlet means for releasing steam to the atmosphere.

13. A cooking vessel according to claim 12 wherein said knob has a central axis, said passage means including an open cavity formed in said surface of the knob, said open cavity surrounding the central axis of the knob to provide convenient communication with said steam releasing hole in the wall of the cooking vessel.

14. A cooking vessel according to claim 12 wherein said whistle chamber of the whistling knob has a vertically extending central axis which is eccentrically located with respect to the body of the knob, said passage means including a vertically extending first portion and a horizontally extending second portion, said first portion of the passage means leading from said surface of the knob, and said second portion of the passage means leading to the whistle chamber.

15. A cooking vessel according to claim 14 wherein said second portion of the passage means has converging walls for increasing the velocity of steam which is moving toward said whistle chamber.

16. A cooking vessel according to claim 15 wherein the second portion of the passage means has a lower wall which slopes downwardly in a direction which causes condensation to drain into the first portion of the passage means.

17. A cooking vessel according to claim 12 wherein the knob includes two members, means for detachably connecting the members to each other, each of said members forming at least one wall of the whistle chamber so that detachment of the members from each other will expose the whistle chamber to permit convenient cleaning thereof.

18. A cooking vessel according to claim 12 wherein the whistling knob has valve means for opening and closing the outlet means of the whistle chamber, said valve means comprising a valve ring which is supported on and is rotatable with respect to the body of the knob, said valve ring having an opening which is movable between positions which expose and obstruct the outlet means of the whistle chamber.

19. A cooking vessel according to claim 18 wherein the body of the knob is formed of two members which are detachably connected together, said valve ring being rotatably supported on one of said members, the other said member comprising means for retaining said valve ring on the knob.

20. A cooking vessel according to claim 12 having a visible temperature-indicating means on said knob, said temperature-indicating means including a visibly exposed temperature-indicating member which is made of a material which changes color in response to temperature changes, said knob including metallic means for conducting heat from the cooking vessel to said temperature-indicating member.

21. A cooking vessel lid having a knob assembly mounted thereon, said knob assembly being provided with a whistle for signalling the presence of steam in a cooking vessel associated with the lid,
said lid having a stud projecting upwardly therefrom along an axis, said lid having a steam releasing hole which is offset from the axis of the stud, said knob assembly being mounted on the stud and being located entirely above the lid so that no portion of the knob assembly extends through or below the lid, a whistle located in said knob assembly for producing an audible whistle in response to the generation of steam in the cooking vessel and rotary movement of the steam in said whistle, said knob assembly having a rotatable means which is angularly movable between a closed position and an open position, said whistle being operable when the rotatable means is in said open position, said whistle being disabled when the rotatable means is in its closed position.

22. A whistling knob for a cooking vessel, said knob having a whistling means for producing an audible whistle in response to the movement of steam therethrough, said knob being provided with a connector means for attaching the knob to a lid of a cooking vessel, said connector means having an internally threaded bore portion for engaging a threaded stud which protrudes from a lid of said cooling vessel, said knob having a lower surface provided with a downwardly open cavity, said cavity being spaced radially outwardly from the connector means in order to receive steam from a hole formed in a lid at a location spaced radially outwardly from the threaded stud on the lid, said cavity being in communication with the whistling means so that steam is carried to said whistling means.

* * * * *